US008606922B1

(12) United States Patent
Greenfield et al.

(10) Patent No.: US 8,606,922 B1
(45) Date of Patent: Dec. 10, 2013

(54) DYNAMIC RESOURCE ZONE MAPPING (75) Inventors: James A. G. Greenfield, Seattle, WA (US); Eric P. Wei, Seattle, WA (US); Diwakar Gupta, Redmond, WA (US); Paul C. Schattauer, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 530 days.

(21) Appl. No.: 12/891,653

(22) Filed: Sep. 27, 2010

(51) Int. Cl.
*G06F 15/173* (2006.01)

(52) U.S. Cl.
USPC .......................................... 709/226

(58) Field of Classification Search
USPC .......................................... 709/226; 707/622
See application file for complete search history.

(56) References Cited

U.S. PATENT DOCUMENTS

| | | | |
|---|---|---|---|
| 7,161,503 B2 * | 1/2007 | Takayanagi | 340/995.12 |
| 8,285,716 B1 * | 10/2012 | Srinivasaiah | 707/730 |
| 8,352,495 B2 * | 1/2013 | LaRowe et al. | 707/780 |
| 8,495,737 B2 * | 7/2013 | Sinha et al. | 726/22 |
| 8,499,034 B2 * | 7/2013 | Karasaridis | 709/203 |
| 2002/0198953 A1 * | 12/2002 | O'Rourke et al. | 709/213 |
| 2004/0162076 A1 * | 8/2004 | Chowdry et al. | 455/445 |
| 2005/0168782 A1 * | 8/2005 | Kobashi et al. | 358/1.18 |
| 2005/0270311 A1 * | 12/2005 | Rasmussen et al. | 345/677 |
| 2008/0059487 A1 * | 3/2008 | Mi et al. | 707/100 |
| 2008/0114886 A1 * | 5/2008 | Kulkarni et al. | 709/229 |
| 2008/0301663 A1 * | 12/2008 | Bahat et al. | 717/170 |
| 2009/0237304 A1 * | 9/2009 | Whalley et al. | 342/463 |
| 2009/0260014 A1 * | 10/2009 | Cameron | 718/104 |
| 2009/0271498 A1 * | 10/2009 | Cable | 709/219 |
| 2010/0138037 A1 * | 6/2010 | Adelberg et al. | 700/241 |
| 2010/0293163 A1 * | 11/2010 | McLachlan et al. | 707/736 |
| 2010/0299313 A1 * | 11/2010 | Orsini et al. | 707/652 |
| 2011/0103374 A1 * | 5/2011 | Lajoie et al. | 370/352 |
| 2011/0107241 A1 * | 5/2011 | Moore | 715/760 |
| 2011/0150492 A1 * | 6/2011 | Davidson et al. | 398/118 |
| 2011/0164880 A1 * | 7/2011 | Davidson et al. | 398/127 |
| 2011/0295778 A1 * | 12/2011 | Homma et al. | 706/12 |
| 2011/0296052 A1 * | 12/2011 | Guo et al. | 709/240 |
| 2012/0113989 A1 * | 5/2012 | Akiyoshi | 370/392 |
| 2012/0259722 A1 * | 10/2012 | Mikurak | 705/26.1 |
| 2012/0271939 A1 * | 10/2012 | Gulley et al. | 709/224 |
| 2012/0271966 A1 * | 10/2012 | Vecchio et al. | 709/246 |
| 2012/0316967 A1 * | 12/2012 | Mgrdechian et al. | 705/14.64 |
| 2013/0124336 A1 * | 5/2013 | Fein et al. | 705/14.66 |

* cited by examiner

*Primary Examiner* — Asad Nawaz
*Assistant Examiner* — Syed S Ali
(74) *Attorney, Agent, or Firm* — Novak Druce Connolly Bove + Quigg LLP (57) ABSTRACT

Techniques, including systems and methods, for organizing access to computing resources include dynamically mapping identifiers of data zones to data zones. A request for initiation of one or more computing resources is received. The request specifies an identifier of a data zone. Responsive to the request, the specified identifier is mapped to a data zone. The requested computing resources are initiated in the data zone to which the identifier was mapped.

19 Claims, 6 Drawing Sheets

DYNAMIC RESOURCE ZONE MAPPING

BACKGROUND

As an increasing number of applications and services are being made available over networks such as the Internet, an increasing number of content, application, and/or service providers are turning to technologies that utilize distributed computing resources, such as remotely operated computing devices and data stores. Providing distributed computing resources, in general, is an approach to providing access to electronic resources through services, such as Web services, where the hardware and/or software used to support those services may be dynamically scalable to meet the needs of the services at any given time. A user or customer typically will rent, lease, or otherwise pay for remote access to resources through, and thus does not have to purchase and maintain the hardware and/or software to provide access to these resources.

Organizations providing distributed computing resource services may allow users to make use of resources that are located in various geographic locations. A user may, for instance, utilize resources in two separate locations so that, if a power outage or other event causes services to be available in one location, resources of the other location may be used. As users utilize and reserve electronic resources, and as organizations expand operations or otherwise change capacity of electronic resources available to users, it may be more advantageous for certain users to utilize electronic resources in one location over resources in another location. One location, for instance, may have substantial excess capacity while another location may have little excess capacity available to users. Because of this, users who select certain locations may inadvertently restrict capacity and limit their growth prospects.

BRIEF DESCRIPTION OF THE DRAWINGS

Various embodiments in accordance with the present disclosure will be described with reference to the drawings, in which.

DETAILED DESCRIPTION

Techniques described and suggested herein include systems and methods for facilitating management of customer orders for computing resources. The computing resources may be provided remotely from a data center and/or other facility and may include resources, such as virtual machine instances, block data storage, physical computing devices, physical or virtual storage volumes, physical or virtual network devices, virtual or physical networks, and/or other resources. Various embodiments of the present disclosure provide users an ability to select from a plurality of data zones, where a data zone may correspond to a data center, collection of data centers, portion of a data center, and the like. Data zones may be grouped into geographic regions and may be geographically distinct from one another. Users may select a data zone during an ordering, provisioning, selection, designation, and/or other process for one or more computing resources by selecting from a plurality of identifiers of the data zones. The identifiers selected by users may be names for data zones as presented to users, which may be different identifiers than used by an organization operating the data zones. When a user selects an identifier, the selected identifier may be mapped to at least one data zone. Others of the identifiers available to the user for selection may also be mapped to data zones at the same time. In addition, the same identifier may be mapped to different data zones for different users.

In an embodiment, mapping a selected identifier to a data zone is based at least in part on one or more considerations. For example, in one embodiment, mapping the selected identifier to a data zone takes into account data zones in which the user already has resources. In this example, if the user has computing resources in one data zone that has previously been mapped to an identifier previously selected by the user, and the user makes a new request for one or more computing resources that specifies an identifier different from the previously selected identifier, then, in an embodiment, the newly specified identifier is mapped to a new data zone different from the data zone in which the user already has resources. The requested resources may be operated in, and provided from, the new data zone. Similarly, a consideration of the location of a user's current resources may be used to determine whether an identifier needs to be remapped. Continuing the previous example, if the user has computing resources in one data zone that has previously been mapped to an identifier previously selected by the user, and the user makes a new request for one or more computing resources that specifies the previously selected identifier, then, in an embodiment, the specified identifier remains mapped to the same data zone. The user is provided the requested resources from the data zone to which the specified identifier was already mapped.

Various other considerations may be taken into account when mapping identifiers to data zones. For instance, mappings of identifiers to data zones may be determined based at least in part a requested capacity and/or available capacity in one or more data zones. In an embodiment, if a user requests one or more computing resources, an identifier specified in the request is mapped to a data zone that is able to accommodate the request. The data zone that is mapped to the specified identifier may be selected in various manners, such as in a random manner subject to the condition that it is able to accommodate the request, or in a manner designed to provide an optimal match between the user's needs for computing resources and the data zone's ability to fulfill the user's needs. For example, the data zone that is mapped to the specified identifier may be selected as the data zone having the most available capacity, where that capacity can include any appropriate capacity such as bandwidth, throughput, or latency, in addition to types of capacity such as storage capacity and processing or "compute" capacity. More sophisticated ways of selecting the data zone to be mapped to the specified identifier may be used. For instance, projections of needed capacity may be used to determine the data zone to which the specified identifier is mapped. The projections may be based at least in part on user indications of future needed capacity from the user and/or other users and/or may be based at least in part on the user's and/or other users' past use of computing resources. If a user, for instance, indicates that he or she will likely need a certain amount of additional resources in a future time period (or the user's past use of resources is used to project a future need of a certain amount of resources), the data zone may be selected as a data zone likely being able to accommodate the user's future needs for capacity. Similarly, indicated and/or projected needs of capacity by other users may be used to select the data zone as being most likely to be able to accommodate both the users' need for future capacity as well as other users' needs for future capacity. Other variations are also considered as being within the scope of the present disclosure, as described in more detail below.

Figure 1:
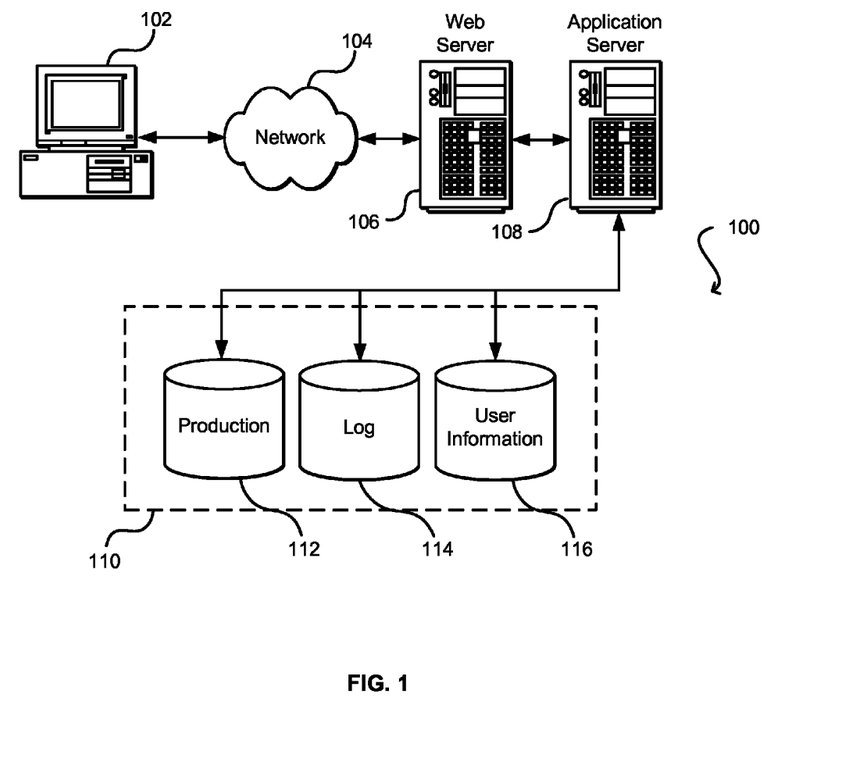
FIG. 1 shows an environment in which various embodiments may be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing log data 114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 110. The data store 110 is operable, through logic associated therewith, to receive instructions from the application server 108 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Figure 2:
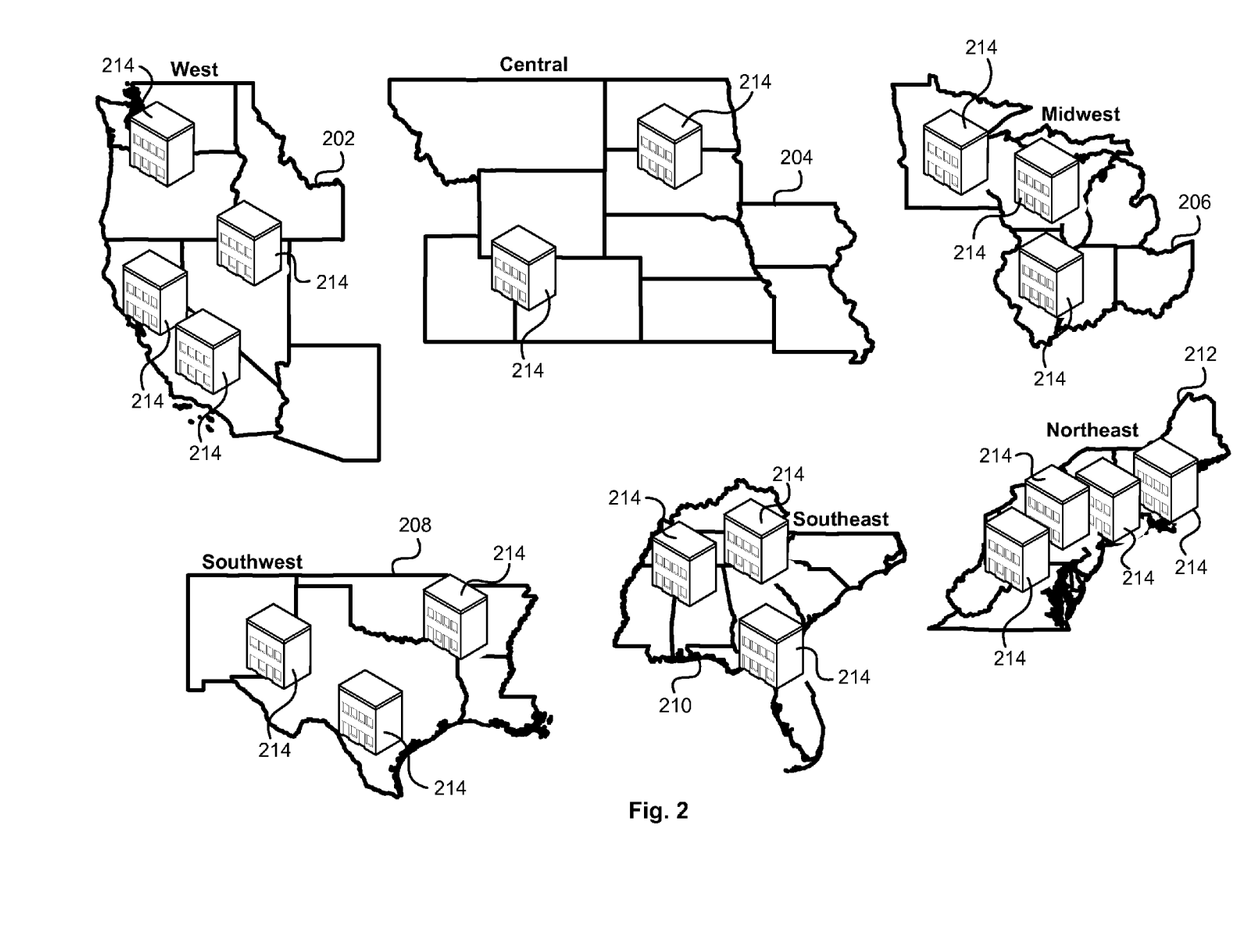
FIG. 2 shows an illustrative example of a map showing regions, each region having one or more data zones.

FIG. 2 shows a diagram illustrating an environment in which various embodiments of the present disclosure may be practiced. In particular, FIG. 2 shows a map 200 of a geographic area, in this instance, the United States of America. As shown, the geographic region represented by the map 200 includes a plurality of geographic sub-regions. For example, as illustrated, the map 200 shows the United States divided into a western region 202, a central region 204, a Midwest region 206, a southwest region 208, a southeast region 210, and a northeast region 212. In this illustrative example, each of the geographic sub-regions comprises a plurality of states. For example, the western region 202 includes the states of Washington, Oregon California, Idaho, Nevada, and Arizona.

Also shown in FIG. 2, each geographic sub-area includes one or more data zones 214. Each data zone 214 may refer to one or more data centers, or groups of data servers, for example, located within a specific geographical area, with different zones being located at or around different geographic locations. In an embodiment, one or more of the data zones 214 comprise a plurality of computing devices operating in a common structure or compound of structures. For example, a data zone 214 may include one or more application servers, web servers, and/or data stores, such as those described above in connection with FIG. 1. Computing devices in a data zone may be used, for instance, to operate one or more virtual machines (also called "instances") on behalf of one or more users who may remotely access the virtual machines using web services or in other ways. A data zone may include one or more block storage devices and/or other storage devices for use with or in addition to the computing devices.

As noted, users may order computing resources in one or more data zones and/or in one or more geographic regions for various reasons. A business utilizing the computing resources in its operations, for instance, may maintain redundant computing resources in different geographic areas to ensure that, if a problem such as a power outage arises in one area, resources in an unaffected area may be utilized. Similarly, redundant computing resources in different geographic areas may be used to serve customers in different areas, providing minimal latency among communications between the customers and computing devices. For instance, an organization may provide services to customers along the west coast from one or more data zones in the western region 202 and other customers along the east coast from one or more data zones in the northeast region 212.

In an embodiment, customers of an organization operating the data zones 214 may provide users an opportunity to specify geographic characteristics regarding locations from where computing resources should be provided. A user may, for instance, specify which geographic region he or she would like to set up one or more instances. For instance, a user may specify that he or she wants to set up one or more instances in the central region 204 and one or more instances in the southwest region 208. The user may also be provided with the opportunity to select one or more data zones from a set of data zones. For instance, the user may select two different data zones from the Midwest region so that, for example, the user has instances in different data centers, but generally in the same geographic area.

While FIG. 2 shows an illustrative example of an environment in which a country (the United States) includes a plurality of regions and where each region has one or more data zones, variations are considered as being within the scope of the present disclosure. For example, geographic regions need not be divided in the particular manner shown in FIG. 2. Also, a region may have more or fewer data zones than shown in FIG. 2. Further, demarcations of regions need not correspond to governmental boundaries, such as state lines, nor do geographic regions need to be geographically distinct. For instance, two adjacent regions may comprise territory common to both. Also, while data zones are shown in FIG. 2 and described herein as located in permanent structures and/or compounds, a data zone may comprise a plurality of structures and/or compounds that may be geographically distinct. Embodiments of the present disclosure are not necessarily restricted to one particular country, but may be practiced in connection with one or more other countries on the same, different, or multiple continents. For example, one or more data zones may be in one or more European, Asian, African, Australian, Middle Eastern, North American, South American, or other data regions, or sub-regions thereof. Data zones may also be portions of structures, such as rooms in a data center. For instance, a data zone may be a segregated room of a larger data center. The larger data center, excluding the segregated room, or a portion thereof may correspond to another data zone. Other variations are also considered as being within the scope of the present disclosure.

In an embodiment, users are provided a user interface to order setup of computing resources. The interface may be provided, as an example, through a web page of an organization that offers the computing resources. As noted, users may be provided the options of selecting one or more data zones for ordered computing resources. A user may be provided a plurality of names of data zones from which to choose. Each name provided to the user may correspond to a particular data zone, which may have a different name internally in the organization that operates the data zone. Further, a name for a data zone presented to one user may correspond to another data zone when presented to another user. Generally, each user may be associated with a mapping of data zone names to data zones where mappings may vary among the users.

Figure 3:
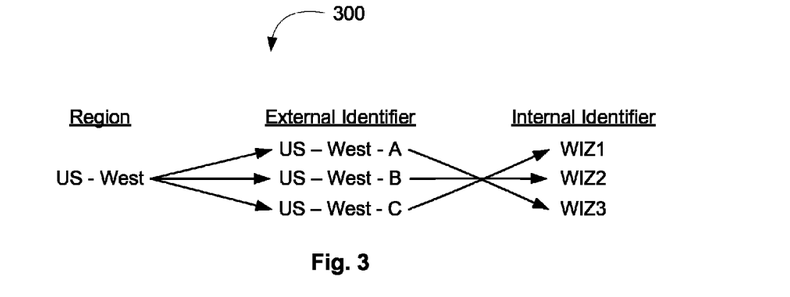
FIG. 3 shows an illustrative example of a mapping of external identifiers of data zones to internal identifiers of data zones for a region, in accordance with an embodiment.

Accordingly, FIG. 3 provides an illustrative example of a diagram 300 of a mapping of data zone names to data zones, in accordance with an embodiment. In this particular example, the diagram 300 shows a mapping of a region (which may correspond to the western region 202, shown in FIG. 2) to external identifiers of data zones, where an external identifier of a data zone may be a name or other identifier of a data zone as presented to the user for which the mapping is used. In the example shown in FIG. 3, the western region corresponds to three external identifiers: US-West-A, US-West-B, and US-West-B. The external identifiers may be provided to a user to allow the user to select one or more of the external identifiers.

Also shown in FIG. 3, the mapping shown in the figure maps each of the external identifiers to an internal identifier, where an internal identifier may be an identifier of a data zone used to identify the data zone consistently for all users that use the data zone. The internal identifiers shown in FIG. 3 are WIZ1, WIZ2, and WIZ3, where WIZ may be an acronym for "Western internal zone." In this example, the US-West-A external identifier is mapped to the WIZ3 internal identifier, the US-West-B external identifier is mapped to the WIZ2 internal identifier, and the US-West-C external identifier is mapped to the WIZ1 internal identifier. In an embodiment, the user is not given information that informs the user which actual data zone the selected external identifier corresponds to. For example, in an embodiment, if the user selects US-West-A, the user may not be provided information that informs the user that US-West-A corresponds to a data zone corresponding to the internal identifier of WIZ3. However, in other embodiments, users may be provided such information, either automatically, upon request, or otherwise.

Figure 4:
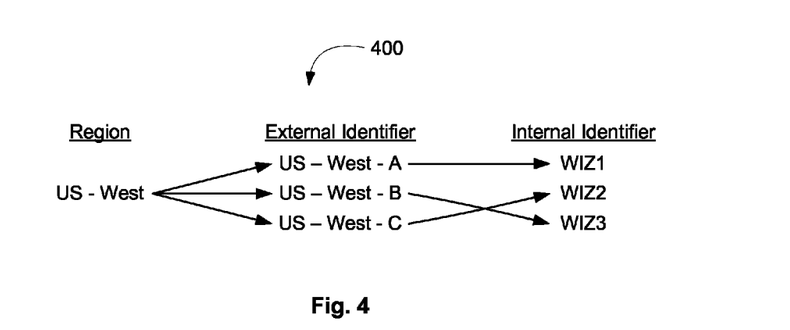
FIG. 4 shows another illustrative example of a mapping of external identifiers of data zones to internal identifiers of data zones for a region, in accordance with an embodiment.

FIG. 4 shows a diagram 400 of a mapping of data zone names to data zones, in accordance with an embodiment. The diagram 400 in FIG. 4 may illustrate a mapping for another user other than the user for whom the mapping illustrated in FIG. 3 is used. In this example, the western region is mapped to the same external identifiers as shown in FIG. 3, that is, the US-West-A, US-West-B, and US-West-B external identifiers. However, in FIG. 4, the mapping of external identifiers to internal identifiers is different than shown in FIG. 3. In particular, the US-West-A external identifier is mapped to the WIZ1 internal identifier, the US-West-B external identifier is mapped to the WIZ3 internal identifier, and the US-West-C external identifier is mapped to the WIZ2 internal identifier. Thus, as illustrated in FIGS. 3 and 4, in an embodiment, different users may see the same external identifiers of data zones, but the actual data zones to which the external identifiers correspond may be different for different users.

Variations of the mappings shown in FIGS. 3 and 4 are contemplated as being within the scope of the present disclosure. For instance, as discussed above, regions may be configured differently and may have different numbers of data zones than illustrated. In addition, while FIG. 3 and FIG. 4 show different users each being provided the same external identifiers, different users may be provided different external identifiers. For instance, if a user is selecting an external identifier as part of an order to set up computing resources, only external identifiers corresponding to data zones that are able to accommodate the user's request may be provided to the user. Thus, for instance, if the user is ordering five hundred computing instances in a western region, and only three out of five data zones in the western region have enough capacity to accommodate an order for five hundred computing instances, then only three external identifiers may be provided to the user. However, if another user is in the process of ordering a single computing instance in the western region, and all data zones in the western region have capacity to accommodate the order of one computing instance, then an external identifier for all of the data zones in the western region may be provided to the user. Generally, more sophisticated ways of determining how many external identifiers should be provided to each user may be used and, in an embodiment, all users are provided the same number of external identifiers for the same region.

As another example of a variation considered as being within the scope of the present disclosure, the mapping between external identifiers and internal identifiers of data zones need not be a one-to-one mapping, as the mappings are illustrated in FIGS. 3 and 4. One external identifier may map to multiple internal identifiers of data zones. Similarly, multiple external identifiers may map to a single internal identifier of a data zone. A mapping of external identifiers to internal identifiers of data zones may be one-to-one for one or more users and not one-to-one for one or more other users.

Figure 5:
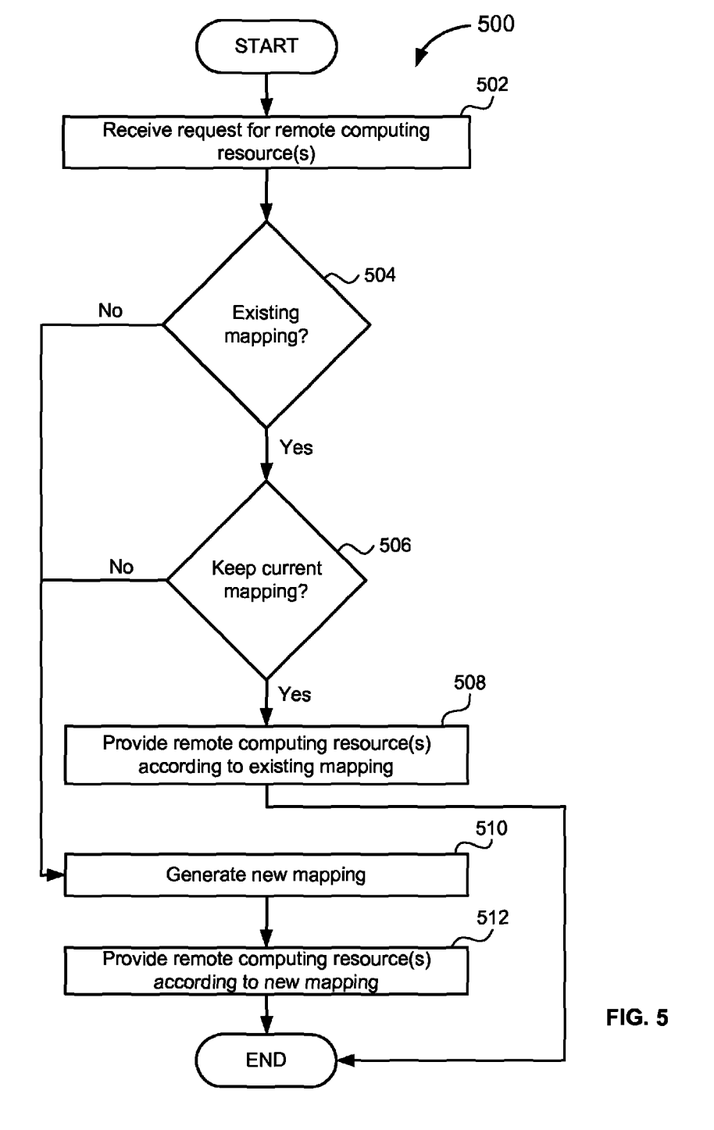
FIG. 5 shows a flowchart for an illustrative example of a process for providing remote computing resources, in accordance with an embodiment.

FIG. 5 shows an illustrative example of a process 500 that may be used to provide remote computing resources utilizing a mapping, such as a mapping discussed above, in accordance with an embodiment. Portions of the process 500 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors.

In an embodiment, in the process 500, a request for one or more remote computing resources is received 502 from a user. A request for one or more remote computing resources may be received in any suitable manner, such as in connection with user interaction with a web page for ordering remote computing resources provided to the user, although other ways of receiving the request may be utilized. The one or more remote computing resources, in an embodiment, include one or more processors that execute one or more virtual machines on behalf of the user. Other remote computing resources that may be requested include resources related to storage of data. For example, the request for one or more remote computing resources may specify storage of a certain amount of data in one or more block or other storage devices that may be utilized by the one or more virtual machines. In an embodiment, the request for one or more remote computing resources may specify one or more external identifiers of one or more corresponding data zones, although it need not. Also, the request for one or more remote computing resources may be a collection of various pieces of information relating to the request that were sent by a user device and received at different times, such as during a multi-stage ordering process.

When the request for one or more remote computing resources is received 502, in an embodiment, a determination is made 504 whether there is an existing mapping for the user. If the user has previously ordered one or more remote computing resources, for instance, a mapping may have already been generated for the user. Similarly, if the user is making an order for one or more remote computing resources for the first time, no mapping may have been generated for the user. If a determination is made 504 that there is an existing mapping for the user, in an embodiment, another determination is made 506 whether to keep the current existing mapping for the user. Various criteria may be used to determine whether to keep the current mapping, some of which will be described in more detail below. For example, if the request for one or more remote computing resources identifies an external identifier that is mapped to a data zone, and that data zone can accommodate the request, then a determination may be made to keep the current mapping the same. Similarly, if the request for one or more remote computing resources identifies an external identifier that is mapped to a data zone, and that data zone cannot accommodate the request, then a determination may be made to change the current mapping. Other scenarios are provided below.

Accordingly, in an embodiment, if a determination has been made 506 to keep the current mapping, the requested one or more remote computing resources are provided 508 to the user according to the existing mapping. If for instance, the request for one or more remote computing resources included a request for a particular external identifier of a data zone, and that external identifier was mapped to a particular data zone by the existing mapping, then, in an embodiment, the requested one or more remote computing resources are provided from the particular data zone. As another example, if the user already utilizes one or more remote computing resources from a particular data zone mapped to a particular external identifier, and if the request for one or more remote computing resources did not specify a different external identifier (or, equivalently, specified the same external identifier), then the requested one or more remote computing resources may be provided from the particular data zone. Providing the one or more remote computing resources may be performed in any suitable manner. For instance, in an embodiment, providing the requested one or more remote computing resources may include setting up one or more virtual machines according to the request and providing access to the one or more virtual machines to the user. The user may, through web services or other ways, provide user input that controls execution of the set up one or more virtual machines. Similarly, if the request specified data storage, the user may be allowed to store data in one or more remote storage devices. Generally, the requested one or more computing resources may be provided in any suitable manner.

In an embodiment, if a determination has been made 504 that there is no existing mapping for the user or a determination has been made 506 not to keep the current mapping, then a new mapping is generated 510. The new mapping may be generated for the user in any suitable manner. For example, a new mapping may be randomly or semi-randomly generated. As another example, a new mapping may be generated in a manner that optimizes one or more aspects of providing remote computing resources to one or more users. As yet another example, a mapping may be generated to provide the requested one or more remote computing resources from an optimal data zone for the user, such as a data zone with the most amount of unused capacity. As yet another example, a mapping may be generated to provide the requested one or more remote computing resources from an optimal data zone for other users, such as a data zone least likely to disrupt remote computing resources provided to other users when the user utilizes his or her provided remote computing resources. When the user already utilizes one or more remote computing resources provided from one or more data zones, one or more conditions may be imposed on a new mapping. For instance, if the user already utilizes one or more remote computing resources provided from one or more data zones mapped to one or more external identifiers, and the user request identifies a different external identifier from the one or more external identifiers, then the new mapping may map the different external identifier to a data zone different from the one or more data zones already used by the user. Other examples of generating a new mapping appear below.

Once the new mapping has been generated, in an embodiment, the requested one or more remote computing resources are provided 512 to the user according to the new mapping. For instance, if the request identified an external identifier of a data zone, the one or more remote computing resources may be provided from a data zone to which the new mapping maps. Providing the one or more remote computing resources may be performed in any suitable manner, such as in ways described throughout the present disclosure.

Figure 6:
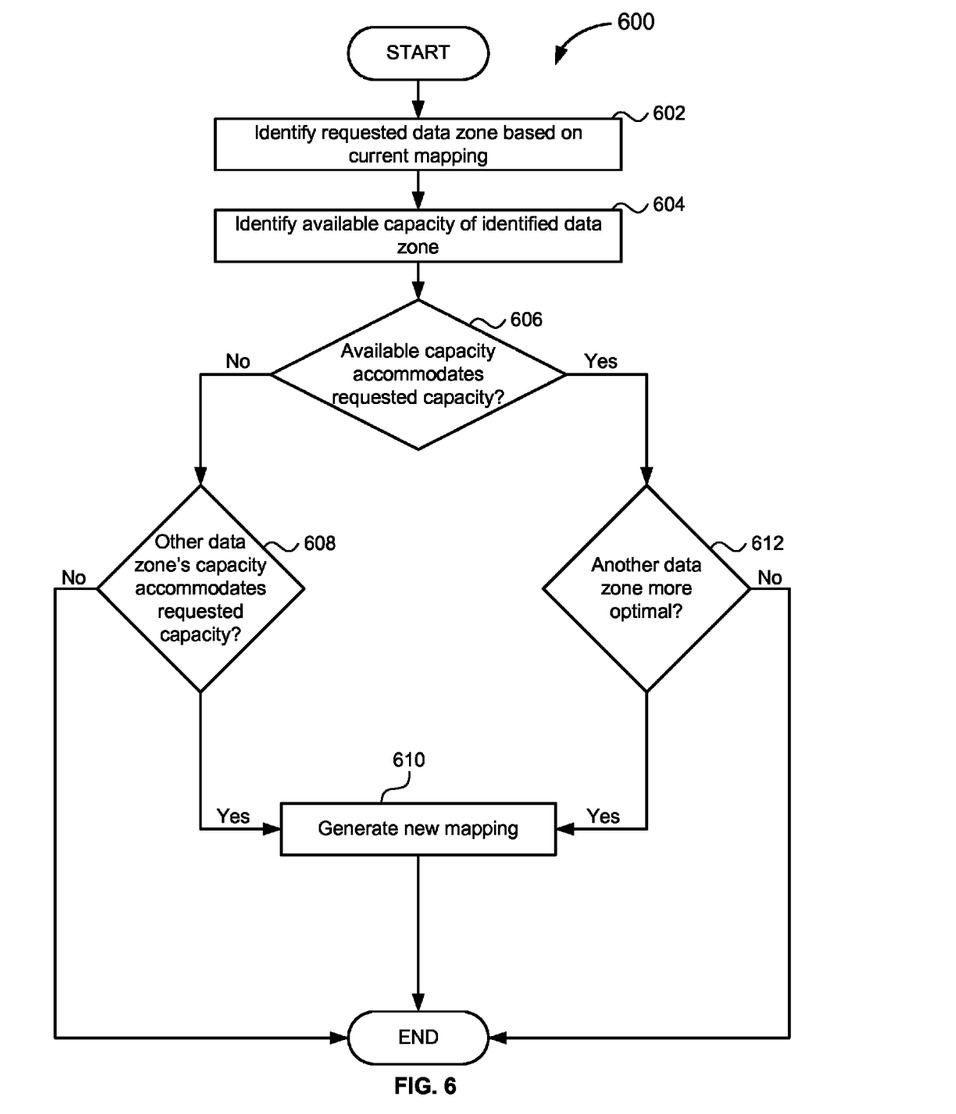
FIG. 6 shows a flowchart for an illustrative example of a process of determining whether to generate a new mapping of identifiers to data zones, in accordance with an embodiment.

FIG. 6 shows a flowchart for an illustrative example of a process 600 for determining whether to generate a new mapping and, if appropriate, generating the new mapping, in accordance with an embodiment. The process 600 shown in FIG. 6, or variations thereof, may be used, for example, in connection with the process 500 discussed above in certain instances. For example, the process 600 may be performed in instances when a mapping exists for a user that has made a request for one or more computing resources. Accordingly, in an embodiment, a requested data zone is identified 602, based at least in part on a current mapping for the user. Looking to FIG. 3 as an example of an existing mapping, if the user had selected the external identifier US-West-A, the data zone corresponding to the internal identifier WIZ3 may be identified. As noted, the user may not actually know which data zone the selected external identifier actually corresponds to, although, in some embodiments, he or she may. In other words, the user may or may not know which data zone he or she requested.

Once the requested data zone is identified, in an embodiment, available capacity of the identified data zone related to a user request for one or more remote computing resources is identified 604. For example, if the user has requested a number of computing instances, the number of instances the identified data zone can provide may be identified. If the user has requested an amount of remote data storage for a particular type of storage device, such as a block storage device, an amount of storage the identified data zone can provide may be identified. The available capacity may be identified based at least in part on various factors, including capacity already used, capacity already reserved for use, governmental or other regulations regarding use of resources with other entities in the same data zone, projections of future resource needs by the user and/or other users, indications by the user and/or other users regarding likely needs of future capacity in the same data zone, and the like. As a simple example, if the identified data zone has total capacity for ten thousand computing instances, and eight thousand computing instances are either in use or reserved, then the identified capacity may be two thousand instances. As a more complex example, if the identified data zone has total capacity for ten thousand instances, five thousand of which are either in use or reserved by other users, and the other users are projected to increase their use of availability capacity by four thousand instances over a time period, then the identified capacity may be one thousand instances. Generally, however, any method of identifying the available capacity of the identified data zone may be used.

In an embodiment, when the available capacity of the identified data zone is identified 604, a determination is made 606 whether the identified available capacity of the identified data zone can accommodate the user's request for one or more remote computing resources. The determination whether the identified available capacity of the identified data zone can accommodate the user's request for one or more remote computing resources may be based at least in part on a comparison of capacity requested by the user and the identified available capacity. Other factors may be taken into consideration when determining whether the identified available capacity of the identified data zone can accommodate the user's request for one or more remote computing resources, such as those factors listed above.

When it is determined that the available capacity is determined to be unable to accommodate the request for one or more computing resources, in an embodiment, a determination is made 608 whether one or more other data zones are able to accommodate the request for one or more computing resources. The determination whether one or more other data zones are able to accommodate the request for one or more computing resources may be made in any suitable manner. For example, one or more algorithms may be used to systematically check whether another data zone can accommodate the requested capacity. Data zones may be ranked according to distance to the identified data zone and checked for an ability to accommodate the request for one or more computing resources. For instance, referring to FIG. 2, if the identified data zone in the request corresponded to the data zone 214 in the western region 202 shown as being in northern Oregon, a determination may be made whether the data zone 214 in the western region 202 shown in northern Nevada can accommodate the requested capacity and, if it cannot, then a determination may be made whether the next closest data zone (either the data zone 214 shown in northern California or the data zone in the central region 204 shown on the border of Utah and Colorado) can accommodate the requested capacity. In another embodiment, all or some of the data zones that are able to accommodate the requested capacity are identified and ranked based at least in part on one or more criteria, including available capacity, distance from the requested data zone, projected future capacity needed by the user and/or other users, and the like.

In an embodiment, when a determination is made 608 that one or more other data zones can accommodate the requested capacity, a new mapping is generated 610, in accordance with an embodiment. Continuing the previous example, if a plurality of data zones have been identified as being able to accommodate the requested capacity, the highest ranked data zone may be mapped to an external identifier requested by the user. As another example, if data zones were sequentially checked, the first data zone identified as being able to accommodate the requested capacity may be mapped to the requested external identifier. Generating the new mapping may include remapping some or all of the data zones. In an embodiment, some or all of the data zones corresponding to a region of the requested data zone are remapped, although all data zones available to the user may be remapped.

If a determination has been made 606 that the requested data zone is able to accommodate the request for one or more computing resources, in an embodiment, a determination is made 612 whether another data zone is more optimal for fulfilling the request. Determining whether another data zone is more optimal may be made based on one or more factors, such as factors described above, including, but not limited to, total unused capacity of the requested data zone and/or one or more other data zones, distance to the requested data zone, and other factors. It should be noted that, while as shown as two separate steps in FIG. 6, determining 606 whether the identified available capacity of the identified data zone can accommodate the user's request for one or more remote computing resources and determining 612 whether another data zone is more optimal for fulfilling the request may be performed together. In addition, determining 606 whether the identified available capacity of the identified data zone can accommodate the user's request for one or more remote computing resources may not be performed, but determining 612 whether another data zone is more optimal for fulfilling the request may be performed together may be performed instead. In an embodiment, if a data zone other than the requested data zone is more optimal, then a new mapping is generated 610. The new mapping may be generated in any suitable manner, such as in a manner described above, such as by mapping an external identifier of the user's request to the most optimal data zone or, generally, any data zone that is more optimal than the requested data zone.

Figure 7:
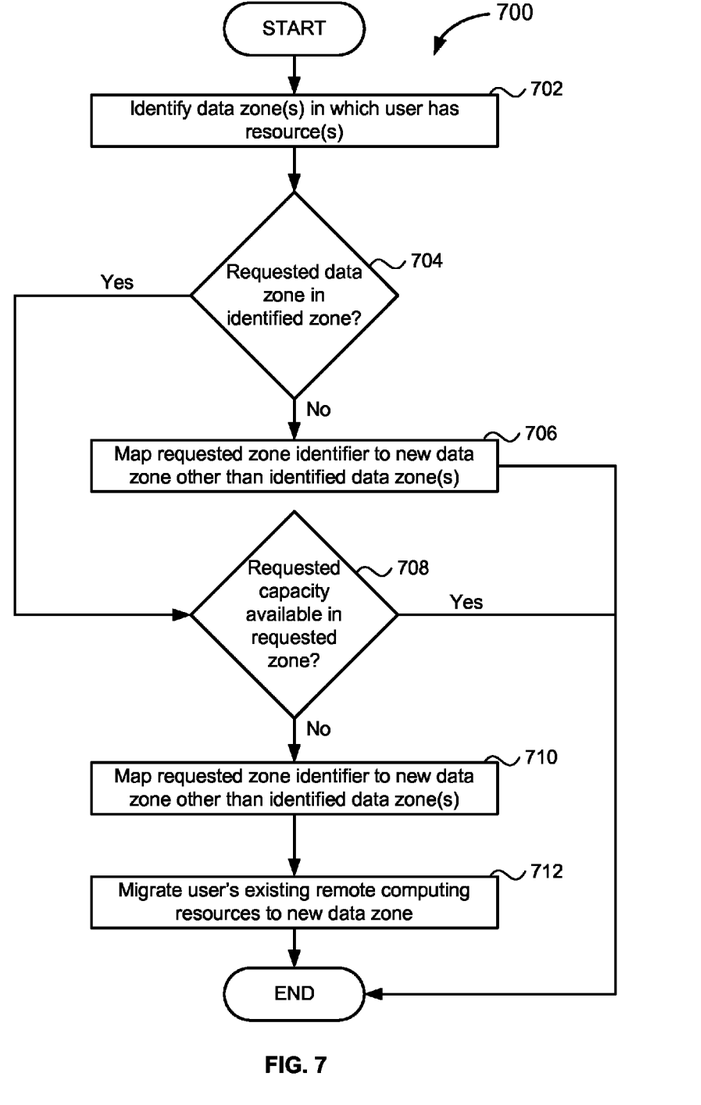
FIG. 7 shows a flowchart for an illustrative example of a process for generating a mapping of data zones to identifiers, in accordance with an embodiment.

In some instances, users may take advantage of multiple data zones. A user, for example, may utilize computing resources in two or more different data zones to ensure that, should one data zone experience operational issues (such as due to a power outage or other problem), operations can continue using one or more other data zones. As another example, a user may utilize multiple data zones in different geographic locations to reduce latency to customers located throughout a broader geographic region. Referring to FIG. 2, for example, a user may utilize resources in a data zone in the western region 202 for users on the western half of the United States and may utilize resources in the northeast region 212 to serve users in the eastern half of the United States. Generally, a user may utilize resources in various data zones for a variety of different reasons. Accordingly, FIG. 7 shows a flowchart for an illustrative example of a process 700 that takes into account users' indication of a desire to utilize resources in multiple data zones. The process 700 may be performed responsive to a user request for one or more computing resources and may be responsive to a determination that the user has requested or has reserved one or more computing resources in one or more data zones.

In an embodiment, one or more data zones in which the user utilizes or has reserved computing resources is identified 702. For example, referring to FIG. 2, if the user currently utilizes resources in the data zone 214 in the western region 202, then the data zone 214 in the western region 202 would be identified. Once the one or more data zones in which the user utilizes or has reserved computing resources is identified 702, in an embodiment, a determination is made 704 whether the requested data zone corresponds to one of the one or more identified data zones. As above, the requested data zone may correspond to an external identifier selected by the user and the user may or may not know the actual data zone to which the selected identifier corresponds. In an embodiment where, for a user, an external identifier is not mapped to a data zone until the external identifier has been selected by the user in a request for computing resources, determining whether the requested data zone corresponds to one of the one or more identified data zones may include determining whether an external identifier selected by the user has been mapped yet.

Alternatively, determining whether the requested data zone corresponds to one of the one or more identified data zones may be based at least in part on an existing mapping. For example, referring to FIG. 3, if the user already utilizes computing resources in a data zone corresponding to the internal identifier WIZ1, and the user has selected the US-West-A external identifier, a determination may be made whether the data zone corresponding to the user's selection corresponds to a data zone in which the user already utilizes computing resources. In this particular example, because the user has resources in the data zone corresponding to WIZ1 and because the selected US-West-A external identifier corresponds to WIZ3, the determination may be that the requested data zone does not correspond to a data zone in which the user has computing resources or has reserved computing resources. If, however, the user had selected US-West-C, the determination would have been that the requested data zone does correspond to a data zone in which the user has computing resources or has reserved computing resources because US-West-C, in the figure's example, corresponds to the data zone corresponding to the internal identifier of WIZ1.

Returning to FIG. 7, if the requested data zone does not correspond to a data zone in which the user already utilizes computing resources or has reserved computing resources, in an embodiment, the external identifier selected by the user is mapped to a data zone other than a data zone in which the user already utilizes computing resources or has reserved computing resources. Referring to the example in FIG. 3, if the user already utilizes resources in a data zone corresponding to the WIZ1 internal identifier and the user had selected the US-West-A external identifier, then the US-West-A external identifier is mapped to either a data zone corresponding to either the WIZ2 or WIZ3 internal identifier. The mapping may be done in any suitable manner, including by determining a most optimal data zone as described above. The mapping may also be random. As an alternative to mapping the requested data zone to a new data zone other than a data zone in which the user already utilizes computing resources or has reserved computing resources, an existing mapping of the requested data zone may be left unchanged. In any event, because the user has requested an external identifier that corresponds to a data zone in which the user does not already utilize computing resources or has reserved computing resources, the requested data zone, in an embodiment, is ensured to correspond to a data zone in which user does not already utilize computing resources or has reserved computing resources. In this manner, if the user's choice of data zone was intentionally different than a data zone in which the user already utilizes computing resources or has reserved computing resources, computing resources are provided to the user in a manner consistent with the user's desire to utilize a different data zone.

In an embodiment, if a determination is made 704 that the requested data zone is, in fact, in a data zone in which the user already utilizes computing resources or has reserved computing resources, a determination is made 708 whether the requested data zone can accommodate the user's request for computing resources. For example, referring to FIG. 2, if the user already uses five hundred computing instances in the data zone 214 in the western region 202 shown as located in northern Oregon, and the user specified an external identifier corresponding to the data zone 214 in the western region 202 shown as located in northern Oregon in a request for one thousand additional computing instances, a determination may be made whether the data zone 214 in the western region 202 shown as located in northern Oregon can accommodate the user's request for one thousand additional computing instances.

If a determination is made 708 that the requested data zone can accommodate the user's request for computing resources, in an embodiment, the requested resources may be provided from the requested data zone. If, however, a determination is made 708 that the requested data zone can accommodate the user's request for computing resources, in an embodiment, an external identifier selected by the user is mapped 710 to a new data zone other than the requested data zone. In an embodiment, the external identifier selected by the user is mapped to a data zone other than a data zone in which the user already utilizes or has reserved computing resources. Mapping the external identifier selected by the user may be done in any suitable manner, including in a random manner, in a manner that maps the external identifier to an optimal data zone, and the like. Mapping the external identifier to a data zone may utilize one or more steps of the other processes described herein, or variations thereof.

In addition, in an embodiment, if a determination is made 704 that the requested data zone is, in fact, in a data zone in which the user already utilizes computing resources or has reserved computing resources, and if a determination is made 708 that the requested data zone cannot accommodate the user's request for computing resources, the user's resources are migrated to the data zone to which the requested external identifier was mapped. Migrating the resources may include setting up identical or substantially identical resources in another data zone. For example, data stored by the user may be stored in the same manner in the new data zone to which the selected identifier was mapped, images of computing instances of the user may be installed in the new data zone, and the like. Generally, any manner of moving resources for the user from one data zone to another may be used.

Variations of the above processes are considered as being within the spirit of the present disclosure. For example, as noted, in various embodiments users do not know the actual data zones to which external identifiers correspond. The same external identifier may correspond to different data zones for different users. However, users may be provided information regarding correspondences of external identifiers to data zones to allow the users to make more informed decisions regarding selection of data zones for computing resources. This may allow, for example, different organizations that collaborate closely the ability to utilize computing resources in the same data zone to optimize latency times when the organizations' systems interact. In addition to the foregoing, when users select external identifiers, the users may be provided information regarding remapping, the reasons therefore, and suggestions that enable user participation in the remapping process. For example, if a user selects an external identifier during a process for ordering computing resources, and the external identifier corresponds to a data zone that can accommodate the user's order, if applicable, the user may be told by an ordering system that the selection is not optimal and may suggest one or more other external identifiers for the user. Similarly, if a data zone corresponding to a selected external identifier cannot accommodate the request, the user may be informed and guided in the selection of another external identifier.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for providing remote computing services, comprising:
   under the control of one or more computer systems configured with executable instructions,
   receiving, from a user, a request for initiation of one or more remote computing resources, the request specifying a selection of a first identifier of a zone from a plurality of identifiers of zones available to the user for selection;
   responsive to receiving the request:
      mapping the selected first identifier to a first data center of a plurality of data centers each being in distinct geographic locations, such that the zone specified by the first identifier is associated with the first data center for at least the user as a result of the mapping;
      initiating the requested one or more remote computing resources in the first data center mapped to the selected first identifier; and
   providing the requested remote computing resources to the user from the first data center mapped to the selected first identifier
   receiving, from the user, a second request for one or more additional computing resources, the second request specifying a second selection of a second identifier from the plurality of identifiers;
   responsive to receiving the second request, determining whether the second identifier is same as the first identifier or different from the first identifier; and
   when the second identifier is the same as the first selected identifier, providing the requested additional one or more remote computing resources to the user from the first data center; or
   when the second identifier is different from the first identifier,
      mapping the selected second identifier to a second data center of the plurality of data centers, the second data center being different from the first data center; and
      providing the requested additional one or more remote computing resources to the user from the second data center mapped to the second identifier.

2. The computer-implemented method of claim 1, wherein mapping the selected first identifier comprises:

determining, based at least in part on a requested capacity of the request for the one or more computing resources, a most optimal data center for fulfilling the request; and selecting, based at least in part on said determining, the first data center as the most optimal data center for fulfilling the request.

3. The computer-implemented method of claim 1, wherein the one or more remote computing resources are virtual computer instances.

4. A computer-implemented method for providing remote computing services, comprising:

under the control of one or more computer systems configured with executable instructions, receiving, from a user, a selection of a first identifier from a plurality of identifiers available for selection to the user, the plurality of identifiers representing a plurality of data zones, the selection of the first identifier corresponding to a request to initiate one or more computing resources; and responsive to receiving the request:

mapping the selected first identifier to a first data zone of the plurality of data zones, each of the data zones corresponding to distinct geographic locations, wherein the first identifier is associated with one of the distinct geographic locations as a result of the mapping for at least the user; and initiating the requested one or more computing resources in a geographic location corresponding, by the mapping, to the selected first identifier mapped to the first data zone, the one or more computing resources provided for access by the user;

receiving, from the user, a second request for one or more additional computing resources, the second request specifying a second selection of a second identifier from the plurality of identifiers;

responsive to receiving the second request, determining whether the second identifier is same as the first identifier or different from the first identifier; and when the second identifier is the same as the first selected identifier, providing the requested additional one or more remote computing resources to the user from the geographic location mapped to the first data zone; or when the second identifier is different from the first identifier, mapping the selected second identifier to a second data zone of the plurality of data zones, the second data zone being different from the first data zone; and providing the requested additional one or more remote computing resources to the user from the geographic location corresponding to the second data zone mapped to the second identifier.

5. The computer-implemented method of claim 4, wherein each of the plurality of data zones corresponds to a data center.

6. The computer-implemented method of claim 4, wherein the one or more computing resources include one or more virtual computer instances.

7. One or more non-transitory computer-readable storage media having collectively stored thereon instructions that, when executed by one or more computer systems, cause the one or more computer systems to:

receive, from a user, a selection of a first identifier from a plurality of identifiers available for selection to the user, the plurality of identifiers representing a plurality of data zones, the selection of the first identifier corresponding to a request to initiate one or more computing resources; and responsive to receipt of the request:

create a mapping that maps the selected first identifier to a first data zone of the plurality of data zones, each of the data zones corresponding to distinct geographic locations, wherein the first identifier is associated with one of the distinct geographic locations for at least the user as a result of the mapping; and cause the requested one or more computing resources to be initiated in a geographic location corresponding, by the mapping, to the selected first identifier mapped to the first data zone, the one or more computing resources provided for access by the user;

receiving, from the user, a second request for one or more additional computing resources, the second request specifying a second selection of a second identifier from the plurality of identifiers;

responsive to receiving the second request, determining whether the second identifier is same as the first identifier or different from the first identifier; and when the second identifier is the same as the first selected identifier, providing the requested additional one or more remote computing resources to the user from the geographic location mapped to the first data zone; or when the second identifier is different from the first identifier, mapping the selected second identifier to a second data zone of the plurality of data zones, the second data zone being different from the first data zone; and providing the requested additional one or more remote computing resources to the user from the geographic location corresponding to the second data zone mapped to the second identifier.

8. The one or more non-transitory computer-readable storage media of claim 7, wherein each of the plurality of data zones corresponds to a data center.

9. The one or more non-transitory computer-readable storage media of claim 7, wherein the plurality of identifiers available for selection to the user corresponds to a region selected by the user.

10. The one or more non-transitory computer-readable storage media of claim 7, wherein the one or more computing resources include one or more virtual computer instances.

11. A computer system for organizing access to computing resources, comprising:

one or more processors;

a data store accessible by the one or more processors; and memory including executable instructions that, when executed by the one or more processors, cause the computer system to:

receive a request for one or more computing resources from a user, at least a portion of the order specifying a first identifier from a plurality of identifiers available to the user, the plurality of identifiers representing a plurality of data zones;

responsive to receipt of the request:

select a first data zone of the plurality of data zones from which to map the specified identifier;

store in the data store a mapping that maps the selected first identifier to the first data zone, wherein the first identifier is associated with one of a plurality of distinct geographic locations for at least the user as a result of the mapping; and cause the requested one or more computing resources to be initiated in the first data zone for access by the user;

receiving a second request for one or more additional computing resources, the second request specifying a second selection of a second identifier from the plurality of identifiers;

responsive to receiving the second request, determining whether the second identifier is same as the first identifier or different from the first identifier; and when the second identifier is the same as the first selected identifier, providing the requested additional one or more remote computing resources to the user in the first data zone; or when the second identifier is different from the first identifier, mapping the selected second identifier to a second data zone of the plurality of data zones, the second data zone being different from the first data zone; and providing the requested additional one or more remote computing resources to the user in the second data zone mapped to the second identifier.

12. The computer system of claim 11, wherein each of the plurality of data zones corresponds to a data center.

13. The computer system of claim 11, wherein selecting the first data zone includes determining an optimal data zone and wherein the first data zone is the optimal data zone.

14. The computer system of claim 11, wherein the plurality of identifiers available to the user corresponds to a region selected by the user.

15. A computer-implemented method for organizing access to remote computing services, comprising:

under the control of one or more computer systems configured with executable instructions, receiving, from a user, a request for one or more computing resources, the request including selection of a first identifier from a plurality of identifiers, the plurality of identifiers representing a plurality of data zones; and responsive to receiving the request:

updating, for the user, a mapping of one or more of the plurality of identifiers to the plurality of data zones, the updated mapping associating at least the selected first identifier to a first data zone, wherein the first identifier is associated with a geographic location for at least the user as a result of the mapping; and initiating the requested one or more computing resources in the geographic location corresponding, by the updated mapping, to the selected first identifier mapped to the first data zone, the one or more computing resources provided for access by the user;

receiving, from the user, a second request for one or more additional computing resources, the second request specifying a second selection of a second identifier from the plurality of identifiers;

responsive to receiving the second request, determining whether the second identifier is same as the first identifier or different from the first identifier; and when the second identifier is the same as the first selected identifier, providing the requested additional one or more remote computing resources to the user from the geographic location mapped to the first data zone; or when the second identifier is different from the first identifier, mapping the selected second identifier to a second data zone of the plurality of data zones, the second data zone being different from the first data zone; and providing the requested additional one or more remote computing resources to the user from the geographic location corresponding to the second data zone mapped to the second identifier.

16. The computer-implemented method of claim 15, wherein updating the mapping includes selecting an optimal data zone as the first data zone.

17. The computer-implemented method of claim 16, wherein selecting the optimal data zone is based at least in part on available capacity in the first data zone.

18. The computer-implemented method of claim 15, wherein the updated mapping is different from one or more mappings of the plurality of identifiers to the plurality of data zones for one or more other users.

19. The computer-implemented method of claim 15, further comprising determining, based at least in part on one or more constraints on one or more of the data zones, whether the mapping is able to be updated and wherein said updating is contingent on a determination that the mapping is able to be updated.

* * * * *